United States Patent
Ji

(10) Patent No.: US 7,848,347 B2
(45) Date of Patent: Dec. 7, 2010

(54) PATTERN-BASED POLLING OF MOBILE STATIONS FOR CHANNEL QUALITY INFORMATION

(75) Inventor: Baowei Ji, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 622 days.

(21) Appl. No.: 11/387,588

(22) Filed: Mar. 23, 2006

(65) Prior Publication Data

US 2007/0223415 A1 Sep. 27, 2007

(51) Int. Cl.
*H04L 12/403* (2006.01)

(52) U.S. Cl. .................... 370/449; 370/346

(58) Field of Classification Search .............. 455/69, 455/452, 513; 370/395, 332, 346, 449
See application file for complete search history.

(56) References Cited

U.S. PATENT DOCUMENTS

| 7,317,702 | B2 * | 1/2008 | Dominique et al. | 370/328 |
| 2002/0131372 | A1 * | 9/2002 | Rinchiuso | 370/252 |
| 2003/0204615 | A1 * | 10/2003 | Wei et al. | 709/232 |
| 2005/0289256 | A1 * | 12/2005 | Cudak et al. | 710/62 |
| 2006/0105719 | A1 * | 5/2006 | Itoh et al. | 455/69 |

* cited by examiner

*Primary Examiner*—Patrick N Edouard
*Assistant Examiner*—Aung Win

(57) ABSTRACT

A channel quality information (CQI) polling controller for use in a wireless communication network is capable of causing a base station to poll a mobile station within its coverage area for CQI at an initial predetermined rate. The controller is also capable of recognizing a CQI variation pattern of the mobile station based upon its responses to a plurality of the CQI polls. The controller is further capable of selecting a CQI polling rate based upon the recognized CQI variation pattern. The controller is also capable of causing the base station to poll the mobile station for CQI at the selected CQI polling rate.

30 Claims, 2 Drawing Sheets

US 7,848,347 B2

PATTERN-BASED POLLING OF MOBILE STATIONS FOR CHANNEL QUALITY INFORMATION

TECHNICAL FIELD OF THE INVENTION

The present disclosure is directed, in general, to reporting of channel quality information by mobile stations of a wireless communication network and, more specifically, to pattern-based polling of mobile stations for channel quality information.

BACKGROUND

The CDMA2000 family of standards was developed for high mobility mobile stations (MSs). As a result, each MS is assigned a dedicated channel quality information channel in the reverse link on which it continuously reports the channel quality of its forward link. In contrast, the IEEE 802.16e standard anticipates moderate MS mobility and a significant proportion of stationary MSs. Thus, in the 802.16e standard, a MS reports its forward link channel quality only when polled by the base station from which it is receiving wireless service.

SUMMARY

The method and system of the present disclosure provide pattern-based polling of mobile stations for channel quality information.

More specifically, aspects of the present disclosure may be found in a method for polling a mobile station for channel quality information (CQI). The method includes polling the mobile station for CQI at an initial predetermined rate. The method also includes recognizing a CQI variation pattern of the mobile station based upon its responses to a plurality of the CQI polls. The method further includes selecting a CQI polling rate based upon the recognized CQI variation pattern. The method also includes polling the mobile station for CQI at the selected CQI polling rate.

Further aspects of the present disclosure may be found in a wireless communication network that includes a plurality of base stations capable of wireless communication with a plurality of mobile stations within a coverage area of the network. The network also includes a CQI polling controller that is capable of causing one of the base stations to poll a mobile station within its coverage area for CQI at an initial predetermined rate. The controller is also capable of recognizing a CQI variation pattern of the mobile station based upon its responses to a plurality of the CQI polls. The controller is further capable of selecting a CQI polling rate based upon the recognized CQI variation pattern. The controller is also capable of causing the base station to poll the mobile station for CQI at the selected CQI polling rate.

Yet other aspects of the disclosure may be found in a CQI polling controller for use in a wireless communication network. The controller is capable of causing a base station to poll a mobile station within its coverage area for CQI at an initial predetermined rate. The controller is also capable of recognizing a CQI variation pattern of the mobile station based upon its responses to a plurality of the CQI polls. The controller is further capable of selecting a CQI polling rate based upon the recognized CQI variation pattern. The controller is also capable of causing the base station to poll the mobile station for CQI at the selected CQI polling rate.

The foregoing has outlined rather broadly the features and technical advantages of the subject matter disclosed so that those skilled in the art may better understand the detailed description that follows. Additional features and advantages will be described hereinafter that form the subject of the claims. Those skilled in the art will appreciate that they may readily use the conception and the specific embodiment(s) disclosed as a basis for modifying or designing other structures for carrying out the same purposes identified herein, as well as other purposes. Those skilled in the art will also realize that such equivalent constructions do not depart from the spirit and scope of the disclosed subject matter in its broadest form.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
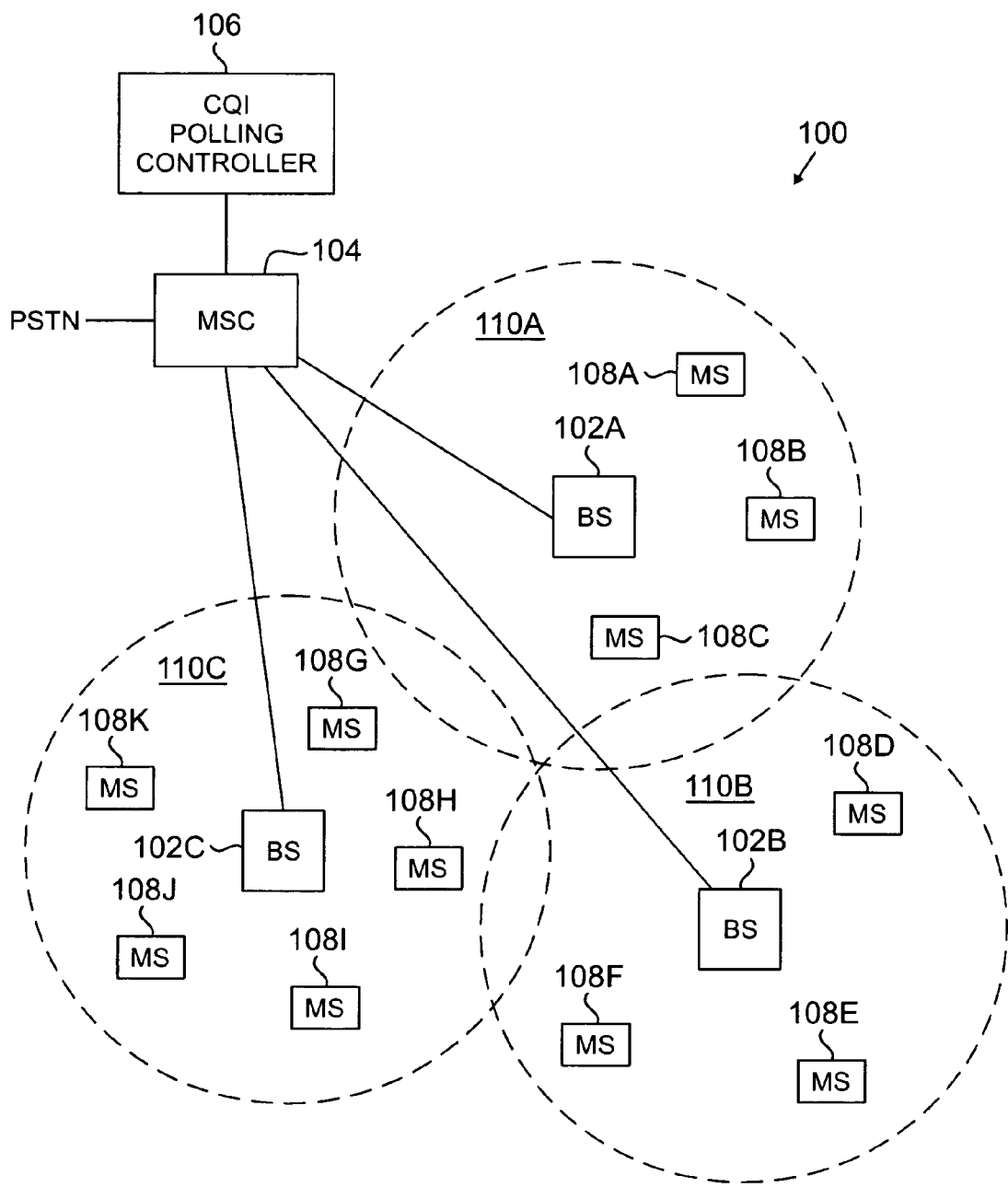
FIG. 1 depicts a block diagram of a wireless communications network according to one embodiment of the present disclosure.
Figure 2:
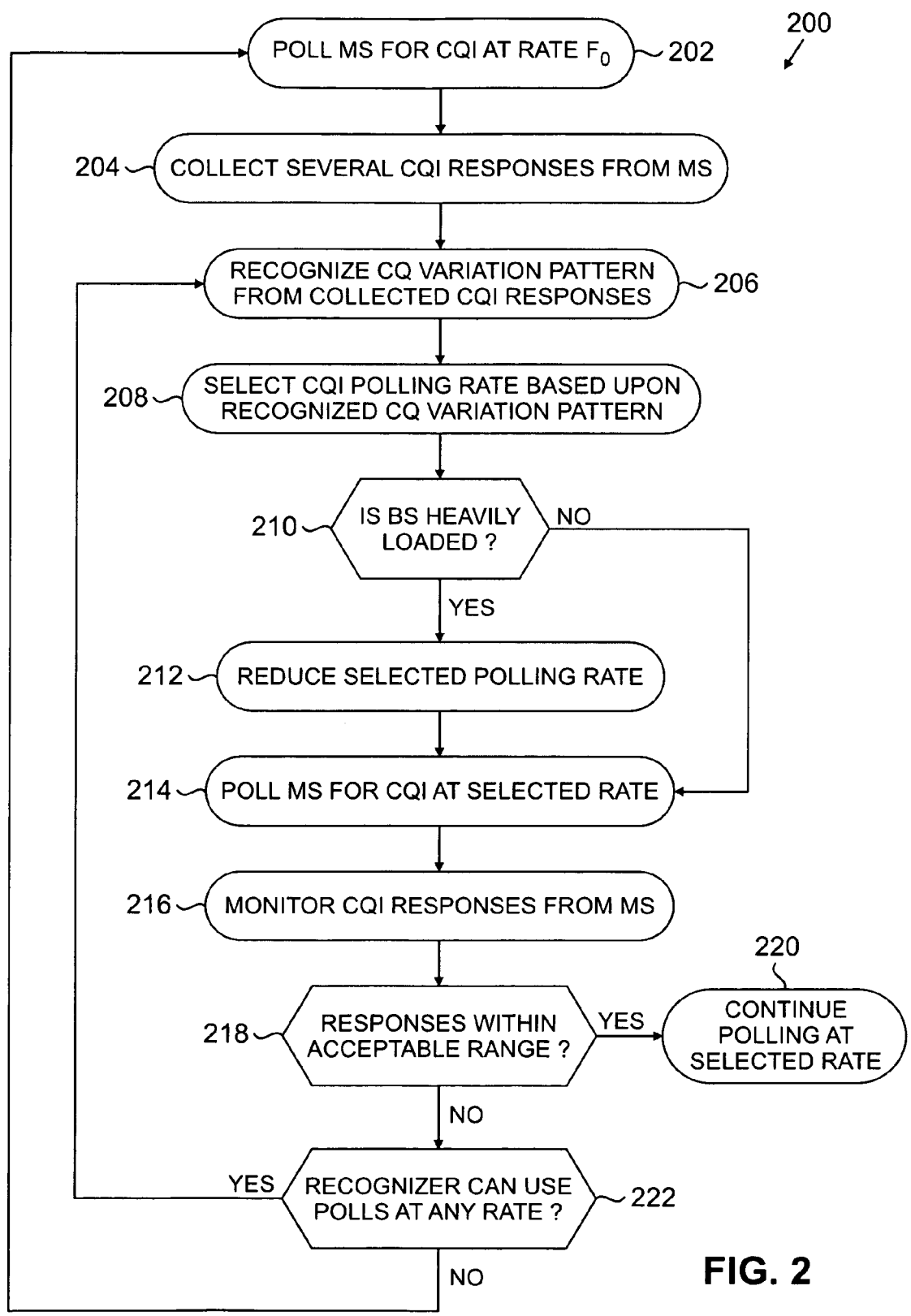
FIG. 2 is a flowchart for a process of selecting a channel quality information polling rate for a mobile station in the embodiment of the disclosure depicted in FIG. 1.

FIGS. 1 and 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

FIG. 1 depicts a schematic view of a wireless communication network 100 according to one embodiment of the present disclosure. The network 100 is capable of pattern-based polling of mobile stations in a coverage area of the network 100 for channel quality information. The network 100 includes BSs 102A-C providing wireless communication services to mobile stations 108A-K within their corresponding coverage areas, or cells, 110A-C, respectively. A BS may comprise a base transceiver station (BTS) coupled to a base station controller (BSC). A BTS comprises one or more RF transceivers, antennas, and other electrical equipment. A base station controller is a device that manages wireless communications resources, including the BTSs, for specified cells within a wireless communications network.

It will be understood that a base station may comprise a single BSC and one or more BTSs, collocated in the center of a coverage area, with antennas radiating outward to the edges of the coverage area. A base station may alternatively comprise a single BSC and a plurality of BTSs in a corresponding plurality of locations, with individual BTS coverage areas joining to form the BS coverage area.

The base stations 102A-C are coupled to a mobile switching center (MSC) 104. The BSs 102A-C transfer voice and data signals between each other and the public switched telephone network (PSTN) via the MSC 104. Also coupled to the base stations 102A-C are channel quality information (CQI) polling controllers 106A-C, whose operation will be discussed with regard to FIG. 2.

While FIG. 1 shows a plurality of CQI polling controllers 106A-C as separate devices coupled to the BSs 102A-C, it will be understood that in another embodiment of the present disclosure a single CQI polling controller may be a separate device coupled to the MSC 104. In yet other embodiments, CQI polling controller functionality may be provided by the MSC 104 itself or by one or more of the base stations 102A-C.

In FIG. 1, mobile stations 108A-C are located within cell, or coverage area, 110A and may be receiving wireless services from the BS 102A. Similarly, mobile stations 108D-F and 108G-K are located within cells 110B and 110C, respectively, and may be receiving wireless services from the BSs 102B and 102C, respectively.

In many types of wireless networks, a base station will require channel quality information (CQI) from a mobile station (MS) within its coverage area in order to allocate communication resources to the MS. Such a requirement arises, for example, in cellular systems (e.g., CDMA2000, 1×EV-DO/DV, WCDMA, HSDPA, etc.), wireless networks (e.g., WiMAX, WiBroIEEE802.16e, etc.), and developing networks (e.g., 3G Evolution, 4G, etc). Where CQI is obtained from MSs by polling, a wireless communications network may implement a polling scheme to organize polling of the MSs.

The channel quality of MSs that are in motion is more likely to change, and more likely to change rapidly, than that of MSs that are stationary. A polling scheme could poll all MSs at a rate sufficiently rapid to serve high-mobility MSs, however this would waste bandwidth by over-polling low-mobility MSs. As a result, a polling scheme is likely to take into account the mobility of an MS in deciding how frequently to poll it.

Thus, a polling scheme may be based upon information related to the type of the MS equipment; that is, handheld, laptop, or desktop. Similarly, the polling scheme may determine the actual velocity of the MS; for example by changes in its reported, GPS-measured position, or by the Doppler shift of its radio frequency signal received at the base station.

However, there are other factors than an expected or actual mobility of a MS that may affect channel quality. For example, the environment in which the MS operates, ground clutter, and automotive traffic may cause the channel quality of even a low mobility MS to change. Therefore, the wireless communication network 100, in one embodiment of the present disclosure, collects a plurality of CQI poll responses from a MS, recognizes a CQI variation pattern in the responses, and, based upon the recognized pattern, selects a CQI polling rate for use in subsequent polling of the MS.

FIG. 2 is a flowchart for a process 200 of selecting a channel quality information polling rate for a mobile station in the embodiment of the disclosure depicted in FIG. 1. The process 200 begins at step 202 when a MS, for example the MS 108A, enters the coverage area 110A and begins communicating with the BS 102A. At that time, the BS 102A may begin polling the MS 108A for CQI at a predetermined initial rate $F_0$. This rate may be obtained from the CQI polling controller 106 or may be determined by the BS 102A. Polling may continue at that rate in step 204 while some predetermined number of CQI poll responses are collected by the base station.

Once a sufficient number of responses have been collected, in step 206, the CQI polling controller may examine the responses, and other information obtained from the MS 108A, in order to recognize a CQI variation pattern. Several attributes of the CQI responses may be included in the pattern. One attribute may be the reported or measured velocity of the MS 108A, as discussed above.

Other attributes may relate to the report by the MS 108A in each CQI response of which subchannels have the best channel quality. More frequent changes in the subchannel IDs from one CQI response to the next may suggest a higher CQI polling rate. Even where the IDs of the best quality subchannels for the MS 108A are changing infrequently, another attribute may be how much the channel quality of each of those subchannels is changing from one CQI response to the next. A higher variability in subchannel quality may suggest a higher CQI polling rate. It will be understood that other information received from the MS 108A, or other attributes of the signal or CQI responses received from the MS 108A, may be used additionally or alternatively in recognizing a CQI variation pattern for the MS 108A without departing from the scope of the present disclosure.

Once the collected CQI responses from the MS 108A have been analyzed and attributes extracted, the CQI polling controller 106 may recognize the pattern (in the step 206) and select a CQI polling rate (in step 208) using any of several types of pattern recognizers within the scope of the present disclosure. In one embodiment of the present disclosure, each attribute may be used as an index into a database or lookup table, where the value of the indexed entry is a CQI polling rate appropriate for a MS having such attributes. In another embodiment of the disclosure, the attributes may be used as inputs to a neural network, fuzzy logic system or support vector machine that generates an appropriate CQI polling rate value as its output.

Such pattern recognizers may be built or trained in any of several ways according to the present disclosure. Attributes extracted from simulated collections of CQI poll responses and other MS signal measurements, along with appropriate CQI polling rates for MSs providing such responses, may be used to build a database or train a neural network. Attributes may be extracted from actual collections of responses and measurements recorded at one or more base stations for actual MSs. Such actual attributes may then be combined with actual CQI polling rates found to be appropriate for the associated MSs in order to build a lookup table or train a support vector machine. Similarly, a pattern recognizer associated with a base station may be built or trained using actual data collected at that base station.

Returning to FIG. 2, once a CQI polling rate is selected in the step 208, the BS 102A may determine in step 210 whether the number of MSs in coverage area 110A is high, resulting in a heavy demand on the communication resources of the BS 102A. If so, then in step 212 the BS 102A may reduce the CQI polling rate selected in the step 208, in order to reduce the burden on its communication resources arising from CQI polling. In step 214, the BS 102A begins polling the MS 108A for CQI at either the selected rate from the step 208 or the reduced rate from the step 212.

Once polling is established in the step 214, the CQI polling controller 106 may monitor subsequent CQI responses or other MS signal measurements in step 216. This subsequent monitoring may be performed in order to ensure that the CQI polling rate selected for the MS 108A continues to be appropriate. For example, where the MS 108A is a handheld device, it may at different times while in use be stationary or in motion. In response to such mobility changes, a CQI polling controller according to the present disclosure may select a new polling rate for the MS 108A. Similarly, where the MS 108A is a stationary device, changes in the environment around the device may result in a change in the channel quality variability experienced by the MS 108A. Such changes may require selection of a new CQI polling rate for the MS 108A in order to obtain its CQI in a timely manner.

Generally, the CQI responses monitored in the step 216 will be checked in step 218 for falling within an acceptable range of values. If the responses are within the acceptable range, polling continues at the selected rate in step 220 and monitoring of the responses continues in the step 218.

It will be understood that other embodiments of the present disclosure may use other techniques for determining in the step 218 whether the selected polling rate remains appropriate for the MS 108A. For example, where the pattern recognizer used in the steps 206 and 208 is capable of accepting attributes collected at a rate other than the rate $F_0$ used in the step 202, a collection of monitored responses from the step 216 may be used as inputs to the pattern recognizer. The polling rate selected for the monitored responses may then be compared to the polling rate selected in the step 208. If the polling rates are the same, then the rate selected in the step 208 remains appropriate and the process 200 continues with the step 220. If the polling rates are not the same, then the process 200 may return to the step 210 to possibly reduce the new selected polling rate and resume polling at the new rate in the step 214.

Having determined in the step 218 that the monitored CQI responses fall outside an acceptable range of values, in step 222 the CQI polling controller may determine whether the pattern recognizer used in the steps 206 and 208 is capable of accepting attributes collected at a rate other than the rate $F_0$ used in the step 202. If so, the process 200 may continue at the step 206 and proceed, as described above, to select a new CQI polling rate according to the responses collected in the step 216. If the pattern recognizer can only accept responses collected at the rate $F_0$, then the process may continue by returning to the beginning at the step 202. In another embodiment of the present disclosure, the CQI polling controller may adjust the selected polling rate for the MS 108A based upon whether the responses monitored in the step 216 are greater or lesser than the acceptable range.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of polling a mobile station for channel quality information (CQI) for use in a wireless communication network comprising a plurality of base stations, capable of wireless communication with a plurality of mobile stations within a coverage area of the network, the method comprising:

polling a mobile station within a coverage area of a base station for CQI at an initial predetermined rate;

recognizing a CQI variation pattern of the mobile station based upon a plurality of responses of the mobile station to a corresponding plurality of the CQI polls, wherein the CQI variation pattern is recognized using a pattern recognizer, the pattern recognizer configured to determine the CQI variation pattern based on a rate of change of the plurality of responses and at least one attribute reported by the mobile station;

selecting a CQI polling rate based upon (i) the recognized CQI variation pattern of the mobile station and (ii) a number of mobile stations within the coverage area of the base station; and polling the mobile station for CQI at the selected CQI polling rate.

2. The method as set forth in claim 1, wherein recognizing a CQI variation pattern is further based upon one of: simulated responses to CQI polls, actual responses to CQI polls by a base station in communication with the mobile station, and actual responses to CQI polls recorded by other base stations.

3. The method of claim 1, wherein the pattern recognizes comprises one of: a look-up table, a database, a neural network, a fuzzy logic system, and a support vector machine.

4. The method as set forth in claim 1, wherein recognizing a CQI variation pattern further comprises extracting a plurality of attributes from the plurality of responses of the mobile station to the CQI polling, wherein the plurality of attributes are selected from a group consisting of reported velocity, measured velocity, subchannel identity, and subchannel quality.

5. The method as set forth in claim 1, wherein the selected CQI polling rate is a first selected CQI polling rate, the method further comprising:

selecting a second CQI polling rate for the mobile station based upon a plurality of responses of the mobile station to the CQI polling at the first CQI rate; and polling the mobile station for CQI at the selected second CQI polling rate.

6. The method as set forth in claim 5, wherein selecting a second CQI polling rate for the mobile station further comprises:

recognizing a second CQI variation pattern of the mobile station based upon the plurality of responses of the mobile station to the CQI polling at the first CQI rate; and selecting the second CQI polling rate based upon the second CQI variation pattern.

7. The method as set forth in claim 5, wherein selecting a second CQI polling rate for the mobile station further comprises:

monitoring the plurality of responses of the mobile station to the CQI polling at the first CQI rate for a response value outside a predetermined range of acceptable values; and in response to detecting the out of range response value, determining the second CQI polling rate for the mobile station.

8. The method as set forth in claim 7, wherein determining the second CQI polling rate for the mobile station further comprises determining the second CQI polling rate based upon a relationship of the out of range response value to the predetermined range of acceptable values.

9. The method as set forth in claim 7, wherein determining the second CQI polling rate for the mobile station further comprises:

recognizing a second CQI variation pattern of the mobile station based upon the plurality of responses of the mobile station to the CQI polling at the first CQI rate; and determining the second CQI polling rate based upon the second CQI variation pattern.

10. The method as set forth in claim 1, further comprising:

reducing the selected CQI polling rate for one of a plurality of mobile stations within a coverage area of one of the plurality of base stations based upon a size of the plurality of mobile stations within the coverage area of the base station, wherein polling the mobile station for CQI further comprises polling the mobile station for CQI at the reduced selected CQI polling rate.

11. A wireless communication network comprising:

a plurality of base stations, capable of wireless communication with a plurality of mobile stations within a coverage area of said network;

a channel quality information (CQI) polling controller, capable of:

causing one of said plurality of base stations to poll a mobile station within a coverage area of said base station for CQI at an initial predetermined rate;

recognizing a CQI variation pattern of said mobile station based upon a plurality of responses of said mobile station to a corresponding plurality of said CQI polls, wherein said CQI variation pattern is recognized using a pattern recognizer, the pattern recognizer configured to determine the CQI variation pattern based on a rate of change of the plurality of responses and at least one attribute reported by the mobile station;

selecting a CQI polling rate based upon (i) said recognized CQI variation pattern of said mobile station and (ii) a number of mobile stations within the coverage area of the base station; and causing said base station to poll said mobile station for CQI at said selected CQI polling rate.

12. The wireless communication network of claim 11, wherein said channel quality information polling controller recognizes said CQI variation pattern based upon one of: simulated responses to CQI polls, actual responses to CQI polls by a base station in communication with the mobile station, and actual responses to CQI polls recorded by other base stations.

13. The wireless communication network of claim 11, wherein said pattern recognizes comprises one of: a look-up table, a database, a neural network, a fuzzy logic system, and a support vector machine.

14. The wireless communication network of claim 11, wherein said channel quality information polling controller recognizes said CQI variation pattern by extracting a plurality of attributes from said plurality of responses of said mobile station to said CQI polling, and wherein said plurality of attributes are selected from a group consisting of reported velocity, measured velocity, subchannel identity, and subchannel quality.

15. The wireless communication network of claim 11, wherein said selected CQI polling rate is a first selected CQI polling rate, and wherein said channel quality information polling controller is further capable of:

selecting a second CQI polling rate for said mobile station based upon a plurality of responses of said mobile station to said CQI polling at said first CQI rate; and causing said base station to poll said mobile station for CQI at said selected second CQI polling rate.

16. The wireless communication network of claim 15, wherein said channel quality information polling controller is further capable of:

recognizing a second CQI variation pattern of said mobile station based upon said plurality of responses of said mobile station to said CQI polling at said first CQI rate; and selecting said second CQI polling rate based upon said second CQI variation pattern.

17. The wireless communication network of claim 15, wherein said channel quality information polling controller is further capable of:

monitoring said plurality of responses of said mobile station to said CQI polling at said first CQI rate for a response value outside a predetermined range of acceptable values; and in response to detecting said out of range response value, determining said second CQI polling rate for said mobile station.

18. The wireless communication network of claim 17, wherein said channel quality information polling controller is further capable of determining said second CQI polling rate based upon a relationship of said out of range response value to said predetermined range of acceptable values.

19. The wireless communication network of claim 17, wherein said channel quality information polling controller is further capable of:

recognizing a second CQI variation pattern of said mobile station based upon said plurality of responses of said mobile station to said CQI polling at said first CQI rate; and determining said second CQI polling rate based upon said second CQI variation pattern.

20. The wireless communication network of claim 11, wherein said channel quality information polling controller is further capable of:

reducing said selected CQI polling rate for said mobile station based upon a size of a plurality of mobile stations within said coverage area of said base station; and causing said base station to poll said mobile station for CQI at said reduced selected CQI polling rate.

21. A channel quality information (CQI) polling controller for use in a wireless communication network comprising a plurality of base stations, said base stations capable of wireless communication with a plurality of mobile stations within a coverage area of said network, said controller capable of:

causing one of said plurality of base stations to poll a mobile station within a coverage area of said base station for CQI at an initial predetermined rate;

recognizing a CQI variation pattern of said mobile station based upon a plurality of responses of said mobile station to a corresponding plurality of said CQI polls, wherein said CQI variation pattern is recognized using a pattern recognizer, the pattern recognizer configured to determine the CQI variation pattern based on a rate of change of the plurality of responses and at least one attribute reported by the mobile station;

selecting a CQI polling rate based upon (i) said recognized CQI variation pattern of said mobile station and (ii) a number of mobile stations within the coverage area of the base station; and causing said base station to poll said mobile station for CQI at said selected CQI polling rate.

22. The channel quality information polling controller of claim 21, wherein said controller recognizes said CQI variation pattern based upon one of simulated responses to CQI polls, actual responses to CQI polls by a base station in communication with the mobile station, and actual responses to CQI polls recorded by other base stations.

23. The channel quality information polling controller of claim 21, wherein said pattern recognizer comprises one of: a look-up table, a database, a neural network, a fuzzy logic system, and a support vector machine.

24. The channel quality information polling controller of claim 21, wherein said channel quality information polling controller recognizes said CQI variation pattern by extracting a plurality of attributes from said plurality of responses of said mobile station to said CQI polling, and wherein said plurality of attributes are selected from a group consisting of reported velocity, measured velocity, subchannel identity, and subchannel quality.

25. The channel quality information polling controller of claim 21, wherein said selected CQI polling rate is a first selected CQI polling rate, and wherein said controller is further capable of:
selecting a second CQI polling rate for said mobile station based upon a plurality of responses of said mobile station to said CQI polling at said first CQI rate; and
causing said base station to poll said mobile station for CQI at said selected second CQI polling rate.

26. The channel quality information polling controller of claim 25, wherein said controller is further capable of:
recognizing a second CQI variation pattern of said mobile station based upon said plurality of responses of said mobile station to said CQI polling at said first CQI rate; and
selecting said second CQI polling rate based upon said second CQI variation pattern.

27. The channel quality information polling controller of claim 25, wherein said controller is further capable of:
monitoring said plurality of responses of said mobile station to said CQI polling at said first CQI rate for a response value outside a predetermined range of acceptable values; and
in response to detecting said out of range response value, determining said second CQI polling rate for said mobile station.

28. The channel quality information polling controller of claim 27, wherein said controller is further capable of determining said second CQI polling rate based upon a relationship of said out of range response value to said predetermined range of acceptable values.

29. The channel quality information polling controller of claim 27, wherein said controller is further capable of:
recognizing a second CQI variation pattern of said mobile station based upon said plurality of responses of said mobile station to said CQI polling at said first CQI rate; and
determining said second CQI polling rate based upon said second CQI variation pattern.

30. The channel quality information polling controller of claim 21, wherein said controller is further capable of:
reducing said selected CQI polling rate for said mobile station based upon a size of a plurality of mobile stations within said coverage area of said base station; and
causing said base station to poll said mobile station for CQI at said reduced selected CQI polling rate.

* * * * *